(12) United States Patent
Berres

(10) Patent No.: US 9,991,927 B2
(45) Date of Patent: Jun. 5, 2018

(54) PROTECTIVE CASE FOR A MOBILE ELECTRONIC DEVICE

(71) Applicant: Andreas Berres, Hamburg (DE)

(72) Inventor: Andreas Berres, Hamburg (DE)

( * ) Notice: Subject to any disclaimer, the term of this patent is extended or adjusted under 35 U.S.C. 154(b) by 3 days.

(21) Appl. No.: 15/349,990

(22) Filed: Nov. 11, 2016

(65) Prior Publication Data

US 2017/0134066 A1    May 11, 2017

(30) Foreign Application Priority Data

Nov. 11, 2015 (DE) .................... 10 2015 014 511

(51) Int. Cl.
*H04B 1/3888* (2015.01)

(52) U.S. Cl.
CPC .................. *H04B 1/3888* (2013.01)

(58) Field of Classification Search
CPC ............ H04B 1/3888; A45C 2011/002; A45C 2011/003; A45C 15/00; A45C 2011/001
USPC ...................................................... 455/575.8
See application file for complete search history.

(56) References Cited

U.S. PATENT DOCUMENTS

| 2004/0011616 A1* | 1/2004 | Rasmussen | A45C 3/02 190/107 |
| 2004/0256869 A1* | 12/2004 | Avishay | E01H 1/12 294/1.4 |
| 2014/0268517 A1* | 9/2014 | Moon | H05K 7/00 361/679.01 |

* cited by examiner

*Primary Examiner* — Yuwen Pan
*Assistant Examiner* — Fatuma Sherif
(74) *Attorney, Agent, or Firm* — Mark Terry

(57) ABSTRACT

A protective case for a mobile electronic device is disclosed, the protective case comprising a receiving part for fastening the device, and a covering part, which is arranged relative to the receiving part such that it can be folded into a closed position, for covering, in the closed state, the device which, in the fitted state, is fastened at the receiving part, wherein the receiving part and the covering part are connected to one another in a pre-tensioned fashion via at least one elastic member in such a manner that the receiving part automatically moves from an opened position into the closed position.

11 Claims, 5 Drawing Sheets

PROTECTIVE CASE FOR A MOBILE ELECTRONIC DEVICE

CROSS-REFERENCE TO RELATED APPLICATIONS

This patent application claims priority to German utility patent application number 10 2015 014 511.8 filed Nov. 11, 2015 titled "Protective Case for a Mobile Electronic Device". The subject matter of patent application number 10 2015 014 511.8 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

Protective cases for electronic devices usually are used for sensitive devices, for example when a breakable screen is likely to crack when falling down. Furthermore, a protective case can prevent the ingress of dust, for instance into the interfaces for plugs. Protective cases, however, also have optical advantages, and can thus be made from noble materials, such as fine leather.

Conventional protective cases, such as those which are already available on the mobile phone market, fasten the device essentially with a positive fit in a holder, in order to protect the edges and the rear side of the device. A cover protects the front side, wherein the cover can be moved away from the device, so that the device, which is placed in the protective cover, can be operated by a user.

In particular the front side, which is frequently also the central operating element of the device, is particularly susceptible to damage, since the central operating element in most cases is a large touch screen, and when damage is caused thereto, the device may not be operable any more.

All protective cases known from prior art involve the problem that the device is only protected against impact in any arbitrary position when the protective case is closed. Only under this condition, all parts of the device being susceptible to damage (such as the screen, connection facilities, operating elements in the form of push-buttons, buttons, speakers or also battery bays) are protected against impact in all falling directions, respectively in any arbitrary position of the device when it falls down.

In this regard problems arise, in particular if the device is dropped while the cover is opened. For instance in the case, where the user makes an input or reads on the display and is pushed at this very moment, the device can slide out of the user's hand and can fall onto the ground with the cover being opened, while the front side is unprotected.

Another drawback in conventional protective cases resides in the aspect that the opened protective cover has to be closed manually. This is, on the one hand, cumbersome and in connection with the above-mentioned drawback can further result in that the device slides out of the hand and falls down.

Therefore, there exists a need to overcome the problems with the prior art, and more particularly for a more efficient protective case for an electronic device.

SUMMARY

A protective case for a mobile electronic device is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a protective case for a mobile electronic device is disclosed, the protective case comprising a receiving part for fastening the device, and a covering part, which is arranged relative to the receiving part such that it can be folded into a closed position, for covering, in the closed state, the device which, in the fitted state, is fastened at the receiving part, wherein the receiving part and the covering part are connected to one another in a pre-tensioned fashion via at least one elastic member in such a manner that the receiving part automatically moves from an opened position into the closed position.

DETAILED DESCRIPTION

Figure 1:
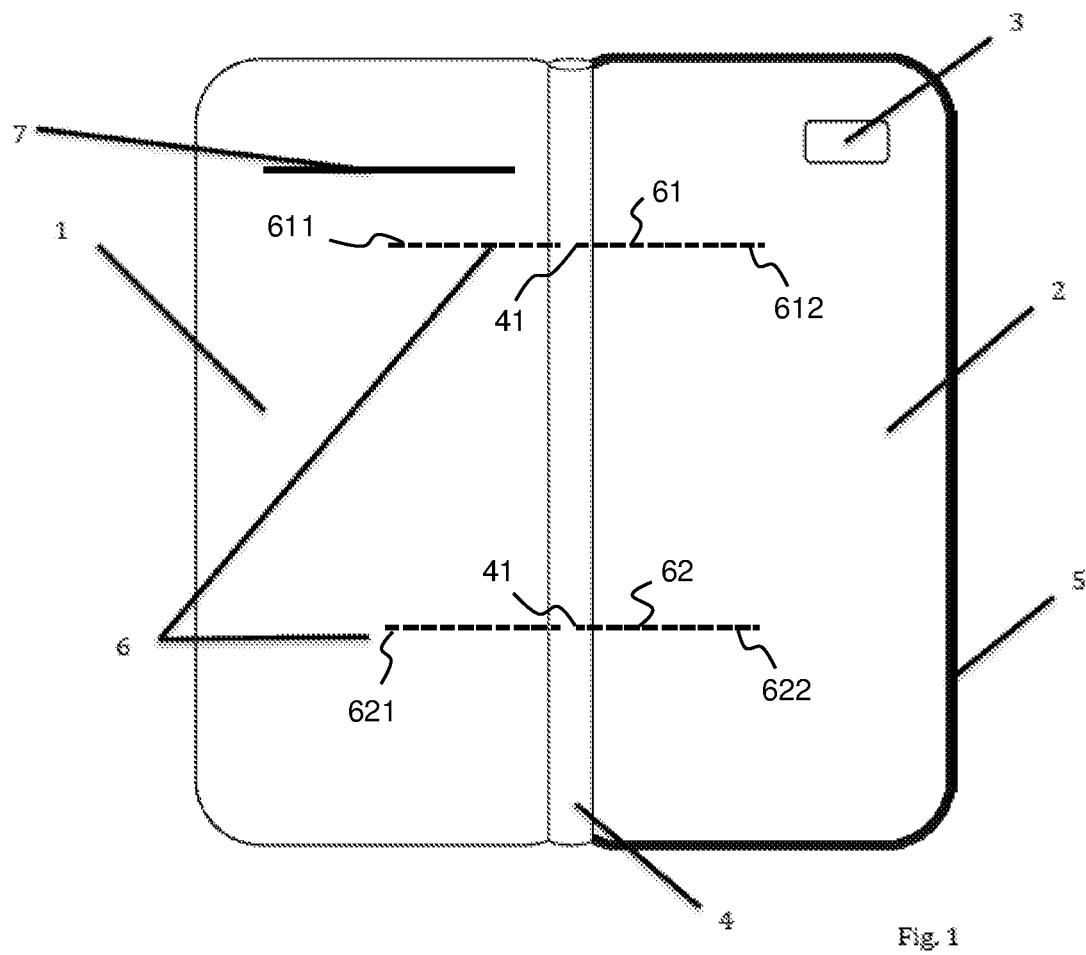
FIG. 1 is a perspective view of a first exemplary embodiment of a protective case for a mobile electronic device in the opened state.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments relate to a protective case for a mobile electronic device. It is an object of the present invention to provide a protective case for a mobile electronic device which overcomes the drawbacks encountered in prior art, and which protects the device, in particular when the device is dropped, independently of the position thereof when falling down, and which furthermore must not be moved manually from the opened position into a closed position.

This object is attained by a protective case according to the independent claim. Advantageous aspects of the invention are the subject-matter of the corresponding dependent claims.

The invention comprises a protective case for a mobile electronic device. The protective case comprises a receiving part for fastening the device and a covering part, which is arranged relative to the receiving part such that it can be folded, for covering the device which is fastened at the receiving part in a closed position. The receiving part and the covering part are connected to one another in a pre-tensioned fashion via at least one elastic member in such a manner that the receiving part automatically moves from an opened position into the closed position. While the elastic member is provided for connecting the receiving part and the covering part in such a manner that they are connected to one another in a pre-tensioned manner in the direction of the closed position, the protective case closes automatically. When the protective case is dropped, it is closed automatically when sliding out of the hand and the device is protected upon the impact independently of the position thereof while falling down. Moreover, the case must not be closed manually in general, but, when the cover is released, it moves automatically from the opened position into a closed position.

According to an advantageous aspect of the invention, the at least one elastic member comprises a first elastic band and a second elastic band which are each fastened at a first end section at the covering part and at a second end section at the receiving part, and the length thereof being selected such that an elastic tension is created in the opened position, as a result of which the covering part automatically moves into the closed position covering the device which, in the fitted state, is fastened at the receiving part. The length of the first and second elastic band is selected such that an elastic (pre-) tension is created in the opened position, as a result of which the covering part automatically moves into the closed position covering the device.

Particularly preferably, the protective case further includes a center rod which is disposed between the receiving part and the covering part. Said center rod can have the diameter and the width of the device, so that the covering part can be folded onto the surface of the fitted device.

Particularly preferably, the center rod features at least one continuous bore, wherein said bore has a diameter of (1-10 mm) which is dimensioned such that the elastic member can be received therein (respectively can be passed therethrough).

Advantageously, the center rod on a side face thereof for instance comprises for example a rectangular recess and a closure cover which can be inserted into the recess. Said rectangular recess preferably has a length of 2 to 20 cm, so that several elastic members can be passed therethrough while being spaced apart from one another. Said rectangular recess has a width which is smaller than the width of the center rod, so that the inserted closure cover is incorporated at the side thereof. The rectangular recess is deeper than the thickness of the closure cover, so that an elastic member is allowed to extend behind the inserted closure cover.

It is an advantageous aspect of the invention that said closure cover comprises at least two passage openings (with a diameter corresponding to the respective elastic member) for passage of the at least one elastic member, so that the at least one elastic member is guided behind the closure cover through the recess. The at least one elastic member thus can be guided around the closure cover without being jammed.

In this regard, a particularly advantageous aspect provides that four passage openings are oppositely disposed in pairs at the border of the closure cover. Hence, the at least one elastic member can be guided twice out of both sides. Here, the passage openings can be designed as lateral notches.

Furthermore, it is particularly advantageous if the receiving part and the covering part on respectively one side thereof are (each) formed in a U-shape with outwardly extending projections. In the fitted state, each projection is arranged at the end faces of the center rod, so as to be rotatable in an articulated fashion (about respectively one rotation axis). Said projections enclose the center rod at an end side thereof, so that the receiving part and covering part can be pivoted about the center rod.

In this regard, it is preferable that the end faces of the center rod each comprise at least two convex (outwardly curved) surfaces for fastening in an articulated fashion a complementarily designed (concave with upwardly curved surfaces) projection. The connection to the nested curved surfaces also allows easy placement of the receiving part and the covering part on the center rod.

Moreover, it is preferable that the receiving part comprises at least one partially encircling border (with a height of 2 to 15 mm extending away from the surface of the receiving part), wherein said border is designed such that an outer contour of a device can be received therein at least at three sides thereof. For this purpose, the border can be designed so as to enclose the inserted device over the length thereof, or can comprise projections into the direction of height.

According to a particularly preferable aspect, the border at least on one side comprises a slot-like opening. Said slot-like opening has a size and shape so as to allow insertion of plugs or smart cards.

FIGS. 1 to 9 illustrate a first exemplary embodiment of a protective case for mobile electronic devices.

The protective case illustrated in FIG. 1 has a receiving part 2 for fastening the device (not illustrated), such as an iPhone or the like. A covering part 1 is movably disposed relative to the receiving part 2. Said covering part 1 is foldable so as to cover the device which, in the fitted state, is fastened at the receiving part 2.

The receiving part 1 and the covering part 1 in the present example are connected to one another in a pre-tensioned manner via two elastic members 6, such that the receiving part 2 (when being released) automatically moves from an opened position into the closed position. Due to the elastic member, the protective case is closed automatically when being dropped after sliding out of the hand, and the device is protected upon the impact independently of the position while falling down. Moreover, it is not necessary in general to close the protective case manually, but when the cover is released, it rather moves automatically from the opened position into a closed position.

In the present example, a first elastic band 61 and a separate second elastic band 62 are disposed in parallel between the covering part 1 and the receiving part 2. The length of the first elastic band 61 and the second elastic band 62 is selected such that an elastic tension is created in the opened position which, upon release, causes automatic movement from an opened position of the covering part 1 into the closed position of the covering part 1. The first elastic band 61 is fastened at the covering part 1 with a first end section 611 and at the receiving part 1 with a second end section 612. The second elastic band 62, in parallel thereto, is equally fastened at the covering part 1 with a first end section 621 and at the covering part 2 with a second end section 622. The arrangement of a first elastic band 61 and a separate second elastic band 62 in parallel makes it possible to configure the closing mechanism in a highly reliable manner.

A center rod 4 is disposed between the receiving part 2 and the covering part 1 and comprises two continuous bores 41. The first elastic band 61 is guided through one bore and the second elastic band 62 is guided through the other bore. Preferably, said bores are created on a side of the center plane of the center rod 4, so that the covering part 1 and the receiving part 2 are moved towards each other. Said bores 41 exhibit a diameter which is somewhat larger than the diameter of the respectively passed through band.

At the receiving part 2 the protective case features a partially encircling border 5, whereby the outer contour of a device can be placed against the inner surface thereof. In the present example, the device is completely enclosed at three sides. The border 5 on one side thereof has a slot-shaped opening 8 for connections, e.g. headphone, recharger or similar add-ons. In addition, the covering part 1 provides an insertion slot 7 for storage of small flat objects, such as credit cards or similarly designed objects. An opening 3 for a camera lens is disposed in the receiving part 2.

Figure 11:
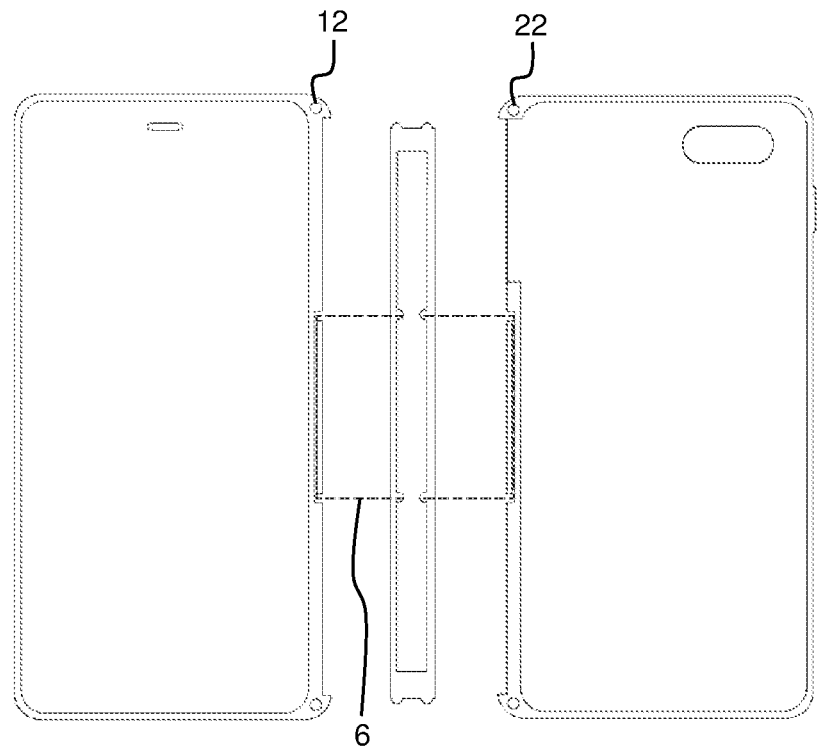
FIG. 11 is a front view of the protective case of FIG. 10 with an elastic member.

Furthermore, a closing mechanism can be arranged, which comprises two mutually supporting members, such as a magnet, a hook and an eye, a button and a hole (cf. FIG. 11).

Figure 2:
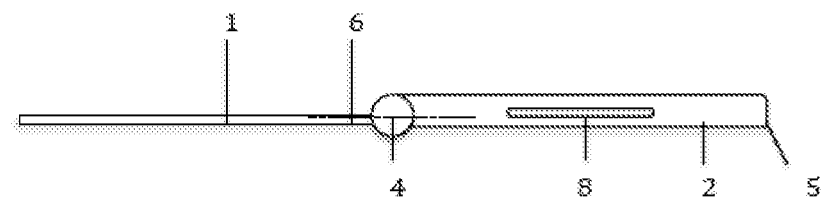
FIG. 2 is a view from below to the protective case of FIG. 1.
Figure 3:
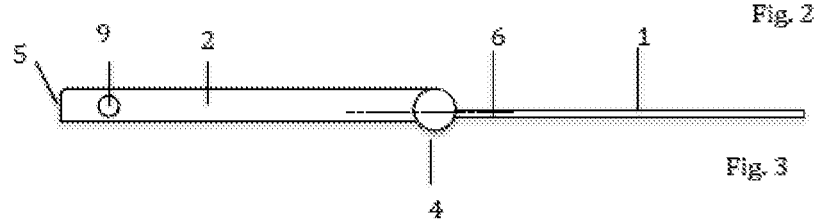
FIG. 3 is a view from above to the protective case of FIG. 1.
Figure 4:
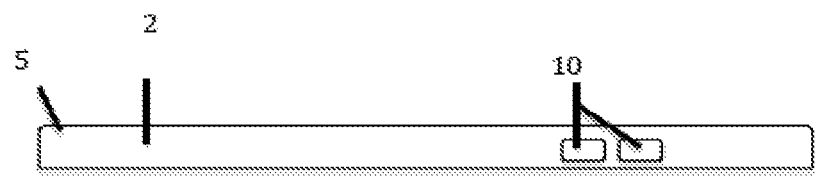
FIG. 4 is a side view of the protective case of FIG. 2 from a flat perspective.
Figure 5:
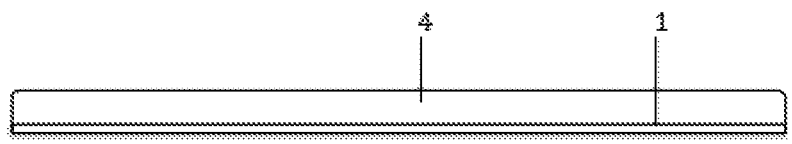
FIG. 5 is another side view of the protective case of FIG. 1 from a flat perspective.
Figure 6:
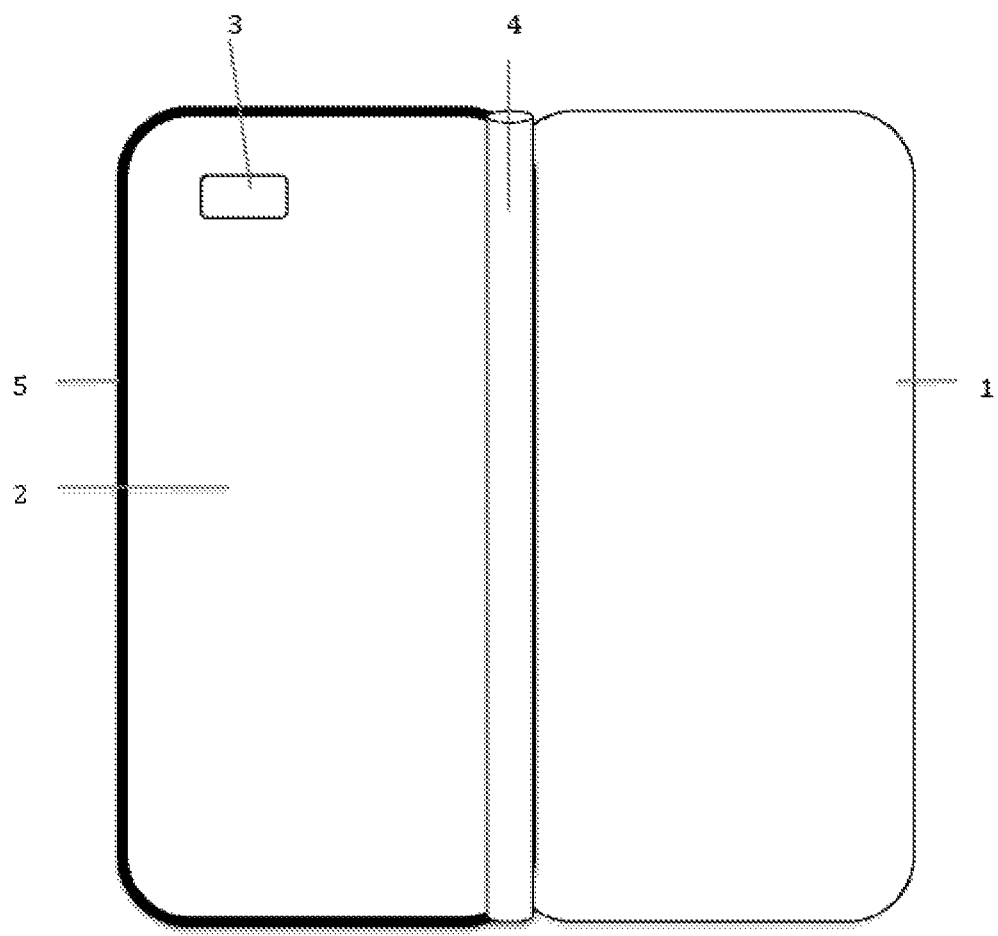
FIG. 6 is a perspective view to the protective case of FIG. 1 in a partially opened state.
Figure 7:
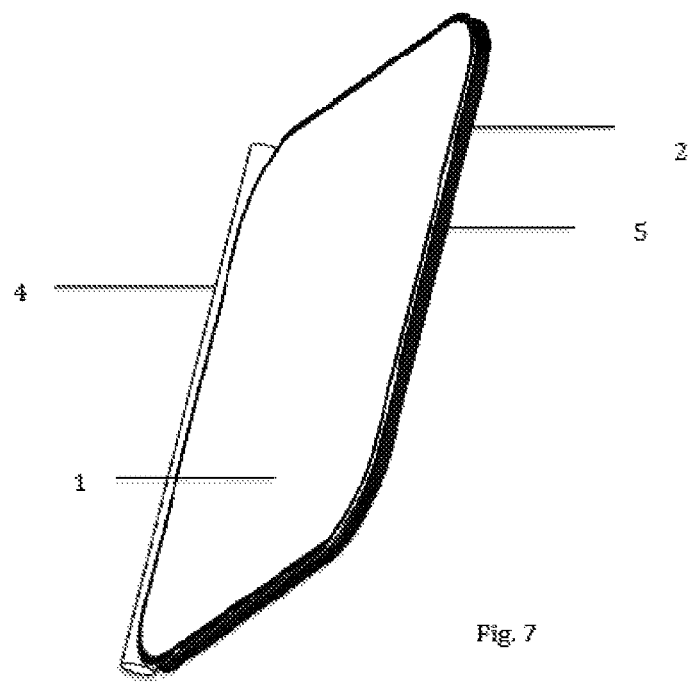
FIG. 7 is a perspective view to the protective case of FIG. 1 in a closed state.
Figure 8:
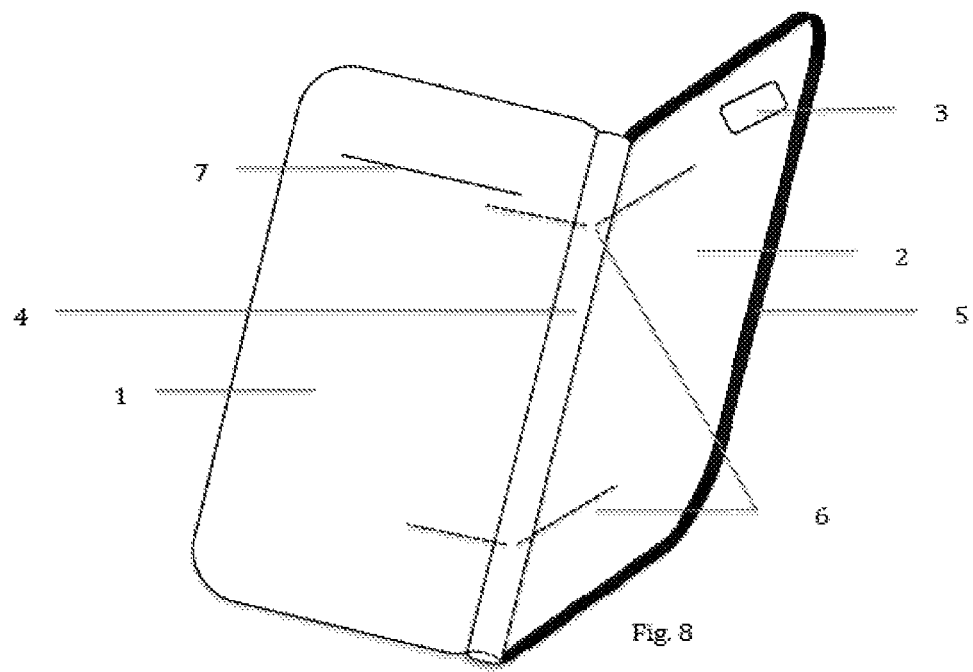
FIG. 8 is a perspective view to the protective case of FIG. 1 in a fully opened state.
Figure 9:
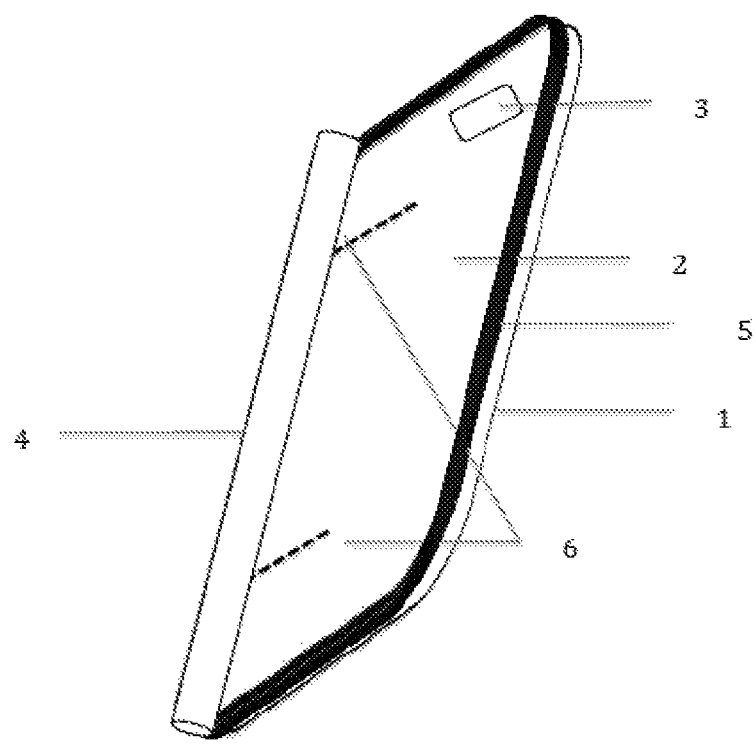
FIG. 9 is another perspective view to the protective case of FIG. 1 in a fully opened state.

FIGS. 2 to 9 show the protective case of FIG. 1 in further perspectives, wherein FIG. 2 is a view from below and FIG. 3 is a view from above to the protective case of FIG. 1. FIG. 4 is a first side view and FIG. 5 is a second side view of the protective case of FIG. 1 each from a flat perspective view. FIG. 6 is a perspective view to the protective case of FIG. 1 in partially opened state and FIG. 7 is a perspective view to the protective case of FIG. 1 in the closed state. FIG. 8 is a perspective view to the protective case of FIG. 1 in a fully opened state, just like FIG. 9.

Figure 10:
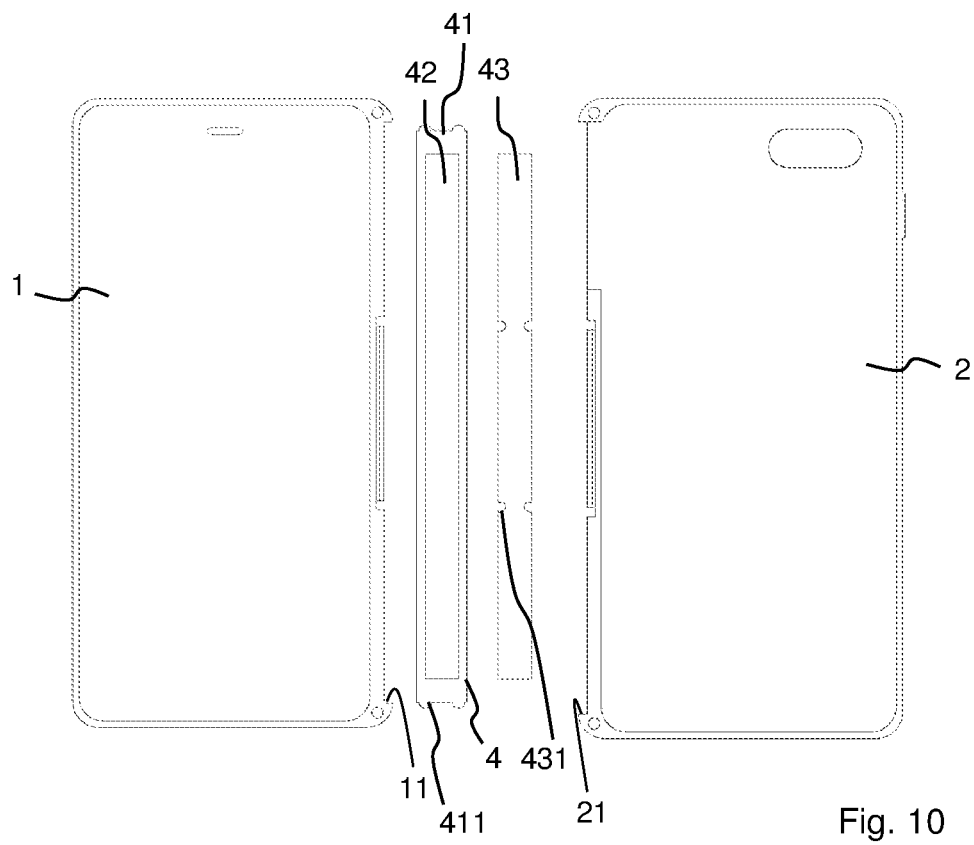
FIG. 10 is a front view of a second exemplary embodiment of a protective case for a mobile electronic device.

FIG. 10 shows a front view of a second exemplary embodiment of a protective case for a mobile electronic device. Here, the protective case equally comprises a receiving part 2 for fastening the device (not illustrated) and a covering part 1 which have a center rod 4 disposed therebetween.

Said center rod 4 on a facing side face exhibits a rectangular elongate recess 42 into which the closure cover 43 being illustrated next thereto is clamped into (see FIG. 11).

The closure cover 43 exhibits four passage openings 431 at the border thereof for the passage of one (single) elastic member 6. The elastic member 6 is an annular rubber piece which is hooked in at the receiving part 2 and at the covering part 1 and is guided through the recess 42 behind the closure cover 43.

The receiving part 2 and the covering part 1 at respectively one side thereof are formed with projections 11, 21 extending outwardly in a U-shape and all facing one another for assembly. Each projection 11, 21 comes into engagement in an articulated fashion at the end faces 41 of the center rod 4.

The end faces of the center rod 4 each comprise two convex surfaces 411 above and two convex surfaces below for fastening in an articulated fashion a complementarily designed projection 11, 21. Magnets 12, 22 are each arranged in the corners of said projections which lie close to each other in the closed position. Hence, the receiving part 2 and the covering part 1 are fastened with respect to each other (in prevention of displacement) in the closed position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. Protective case for a mobile electronic device, the protective case comprising a receiving part for fastening the device, and a covering part, which is arranged relative to the receiving part such that it can be folded into a closed position, for covering, in the closed state, the device which, in a fitted state, is fastened at the receiving part, wherein the receiving part and the covering part are connected to one another in a pre-tensioned fashion via at least one elastic member in such a manner that the receiving part automatically moves from an opened position into the closed position, further comprising a center rod which is arranged between the receiving part and the covering part, characterized in that said center rod on one side face thereof comprises a rectangular recess and a closure cover which can be inserted into the recess, wherein the closure cover comprises at least two passage openings for the passage of the at least one elastic member, so that the at least one elastic member is guided behind the closure cover through the recess and wherein four passage openings are oppositely disposed in pairs at the border of the closure cover.

2. Protective case according to claim 1, wherein the at least one elastic member comprises a first elastic band and a second elastic band, which are each fastened at a first end section at the covering part and at a second end section at the receiving part, the length thereof being selected such that an elastic tension is created in the opened position, as a result of which the covering part automatically moves into the closed position covering the device which, in the fitted state, is fastened at the receiving part.

3. Protective case according to claim 1, further comprising a center rod which is arranged between the receiving part and the covering part.

4. Protective case according to claim 2, wherein the center rod comprises at least one continuous bore, wherein the bore has a diameter which is dimensioned such that the elastic member can be received therein.

5. Protective case according to claim 3, wherein said center rod on one side face thereof comprises a rectangular recess and a closure cover which can be inserted into the recess.

6. Protective case according to claim 5, wherein the closure cover comprises at least two passage openings for the passage of the at least one elastic member, so that the at least one elastic member is guided behind the closure cover through the recess.

7. Protective case according to claim 6, wherein four passage openings are oppositely disposed in pairs at the border of the closure cover.

8. Protective case according to claim 1, wherein the receiving part and the covering part on respectively one side thereof are formed with an U-shape with outwardly extending projections, and wherein each projection is arranged so as to be rotatable in an articulated fashion at the end faces of the center rod.

9. Protective case according to claim 8, wherein the end faces of the center rod each comprise at least two convex surfaces for articulately fastening a complementarily designed projection.

10. Protective case according to claim 1, wherein the receiving part comprises at least one partially encircling border, wherein said border is designed such that an outer contour of a device can be received therein at least at three sides thereof.

11. Protective case according to claim 10, wherein the border comprises a slot-like opening at least at one side thereof.

* * * * *